US011374512B2

(12) United States Patent
Ohori et al.

(10) Patent No.: US 11,374,512 B2
(45) Date of Patent: Jun. 28, 2022

(54) MOTOR AND BRUSHLESS WIPER MOTOR

(71) Applicant: MITSUBA Corporation, Gunma (JP)

(72) Inventors: Ryo Ohori, Gunma (JP); Naoki Shioda, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 17/292,456

(22) PCT Filed: Oct. 1, 2019

(86) PCT No.: PCT/JP2019/038746
§ 371 (c)(1),
(2) Date: May 10, 2021

(87) PCT Pub. No.: WO2020/100457
PCT Pub. Date: May 22, 2020

(65) Prior Publication Data
US 2021/0328528 A1    Oct. 21, 2021

(30) Foreign Application Priority Data
Nov. 13, 2018   (JP) .............................. JP2018-212818

(51) Int. Cl.
*H02P 6/10* (2006.01)
*B60S 1/08* (2006.01)

(52) U.S. Cl.
CPC ...... *H02P 6/10* (2013.01); *B60S 1/08* (2013.01); *H02P 2207/055* (2013.01)

(58) Field of Classification Search
CPC ..................................... H02P 6/10; B60S 1/08
USPC ................................................. 318/400.23
See application file for complete search history.

(56) References Cited

U.S. PATENT DOCUMENTS

| 5,386,162 | A | * | 1/1995 | Horst | H02K 19/103 310/269 |
| 2004/0119363 | A1 | * | 6/2004 | Tanaka | H02K 21/16 310/214 |
| 2010/0123426 | A1 | * | 5/2010 | Nashiki | H02K 1/146 310/46 |

FOREIGN PATENT DOCUMENTS

| DE | 19848790 A1 * | 4/1999 | ........... H02K 19/103 |
| JP | 2000312447 | 11/2000 | |
| JP | 2004015968 | 1/2004 | |
| JP | 2005210828 | 8/2005 | |
| JP | 2010119263 A * | 5/2010 | ............... H02K 1/12 |

(Continued)

OTHER PUBLICATIONS

"International Search Report (Form PCT/ISA/210) of PCT/JP2019/038746", dated Dec. 24, 2019, with English translation thereof, pp. 1-4.

*Primary Examiner* — Jorge L Carrasquillo
(74) *Attorney, Agent, or Firm* — JCIPRNET

(57) ABSTRACT

A motor includes: a stator having an annular stator core and multiple teeth protruding radially inwards from the stator core; a coil wound around the teeth; a shaft rotating around the rotation axis radially inside of the stator core; a rotor core fixed to the shaft; magnets positioned on the outer peripheral surface of the rotor core; a salient pole positioned between magnets adjacent to each other in the circumferential direction; an applying portion applying a voltage to the coil; and an applying control portion controlling the applying portion. The ratio of the number of magnetic poles of the magnets and the number of teeth is 2:3. The voltage is a rectangular wave, and its application is started when the tip of the salient pole does not face an opening in the teeth.

5 Claims, 15 Drawing Sheets

(56) References Cited

FOREIGN PATENT DOCUMENTS

| | | | | |
|---|---|---|---|---|
| JP | 2010268632 A | * 11/2010 | ............... | H02K 1/12 |
| JP | 2011004583 | 1/2011 | | |
| JP | 2013085407 | 5/2013 | | |
| JP | 2016214081 | 12/2016 | | |

* cited by examiner

MOTOR AND BRUSHLESS WIPER MOTOR

CROSS-REFERENCE TO RELATED APPLICATION

This application is a 371 application of the international PCT application serial no. PCT/JP2019/038746, filed on Oct. 1, 2019, which claims the priority benefits of Japan application no. 2018-212818, filed on Nov. 13, 2018. The entirety of each of the abovementioned patent applications is hereby incorporated by reference herein and made a part of this specification.

BACKGROUND

Technical Field

The disclosure relates to a motor and a brushless wiper motor.

Description of Related Art

A brushless motor (hereinafter may be simply referred to as a motor) includes a stator having teeth wound around by coils, and a rotor rotatably provided radially inside the stator. The rotor of such a brushless motor has a rotation shaft, a substantially column-shaped rotor core externally fitted and fixed to the rotation shaft, and permanent magnets provided on the rotor core. When electric power is supplied to the coil of such a brushless motor, an interlinking magnetic flux is formed in the stator, so that magnetic attractive or repulsive forces are generated between the formed interlinking magnetic flux and the permanent magnets provided on the rotor core, and the rotor continuously rotates.

There are mainly two methods for arranging the permanent magnets on the rotor. One is the interior permanent magnet (IPM) method in which a plurality of slits are formed on the rotor core and the permanent magnets are disposed in the slits. The other one is the surface permanent magnet (SPM) method in which the permanent magnets are disposed on the outer circumferential surface of the rotor core (for example, please refer to Patent Document 1).

There are mainly two ways to configure a magnetic circuit of the brushless motor of the SPM method. One is the SPM brushless motor that uses a ring magnet as the magnetic circuit. The other one is the SPM brushless motor that uses a segment magnet as the magnetic circuit.

The SPM brushless motor having the ring magnet generally has less vibration and noises than the SPM brushless motor having the segment magnet. However, the SPM brushless motor having the ring magnet has the problem of being more likely to increase in size than the SPM brushless motor having the segment magnet.

Therefore, when miniaturization and weight reduction are emphasized, the SPM brushless motor having the segment magnet may be used instead of the SPM brushless motor having the ring magnet. However, since the SPM brushless motor having the segment magnet rotates the rotor by using the reluctance torque, there is the problem that the torque ripple is deteriorated due to a change in inductance according to the rotor rotation angle, so that the vibration and noises are generated.

Document of Related Art

Patent Document

Patent Document 1: Japanese Laid-open Publication No. 2016-214081

SUMMARY

Technical Problem

In view of the above, the disclosure provides a technique for suppressing the occurrence of vibration or noises generated by an SPM brushless motor having a segment magnet as a magnetic circuit.

Solution to the Problem

An aspect of the disclosure is a motor that includes a stator having a stator core that is annular and a plurality of teeth that protrude inward in a radial direction from an inner circumferential surface of the stator core; a coil wound around the teeth; a shaft rotating around a rotation axis inside the stator core in the radial direction; a rotor core fixed to the shaft and having the rotation axis as a radial center; a magnet located on an outer circumferential surface of the rotor core; a salient pole located between the magnets circumferentially adjacent to each other on the outer circumferential surface of the rotor core and protruding further outward than a circumferential end of the magnet in the radial direction; an applying portion applying a voltage to the coil; and an applying control portion controlling the applying portion to apply a voltage that satisfies a predetermined condition to the coil. A ratio of a number of magnetic poles of the magnet to a number of the teeth is 2:3. A waveform of the voltage applied to the coil is a rectangular wave. The applying control portion controls the applying portion such that voltage application to the coil is started when a tip of the salient pole and an opening portion of the teeth do not face each other.

An aspect of the disclosure is that in the motor, the voltage applied to the coil has an advance angle that is a predetermined advance angle among advance angles greater than or equal to 15 degrees and less than or equal to 45 degrees, and a conduction angle that is a predetermined conduction angle among conduction angles greater than or equal to 130 degrees and less than or equal to 150 degrees.

An aspect of the disclosure is that in the motor, the advance angle is greater than or equal to 15 degrees and less than 30 degrees.

An aspect of the disclosure is that the motor further includes an acquisition portion acquiring information about an operation environment, and the applying control portion controls the applying portion to apply a voltage having a waveform that is a rectangular wave and an advance angle or a conduction angle that is based on the information.

An aspect of the disclosure is a brushless wiper motor including the motor.

Effects

According to the disclosure, the vibration or noises generated by the SPM brushless motor having the segment magnet as the magnetic circuit can be reduced.

DESCRIPTION OF THE EMBODIMENTS

Next, a motor and a brushless wiper motor according to the embodiment of the disclosure are described with reference to the drawings.

First Embodiment (Wiper Motor)

Figure 1:
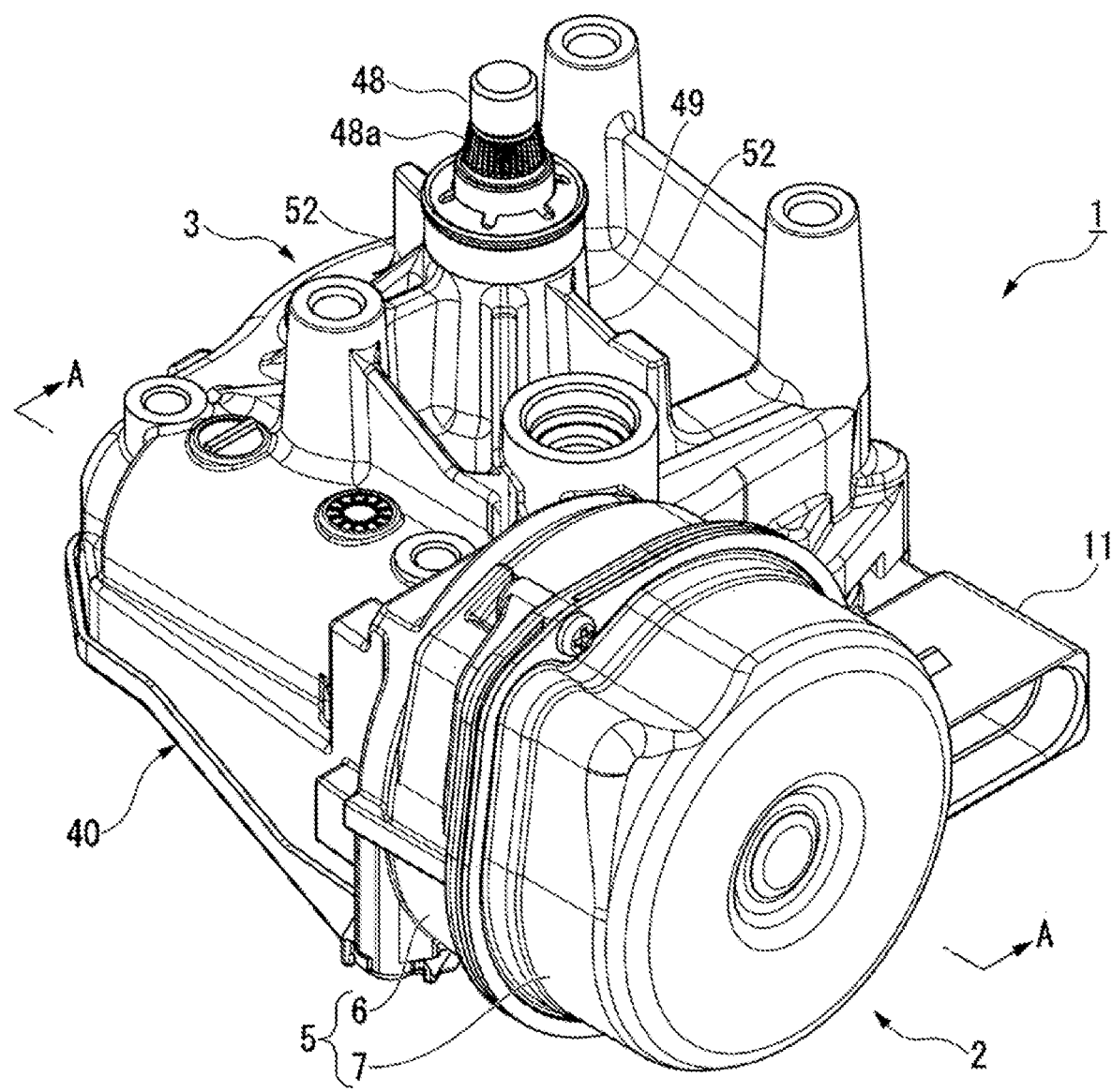
FIG. 1 is a perspective view of a wiper motor 1 of the first embodiment.
Figure 2:
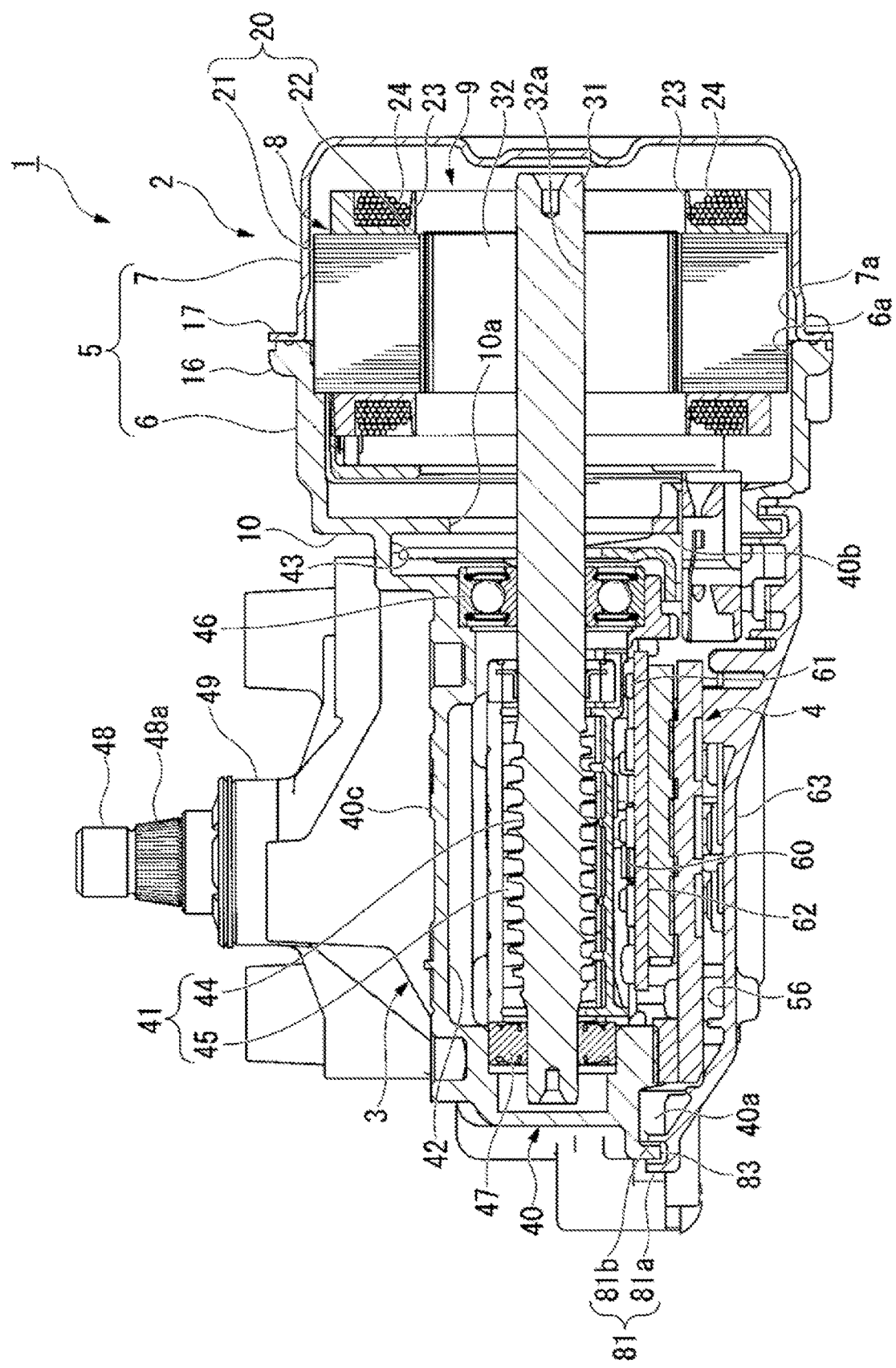
FIG. 2 is a cross-sectional view of the wiper motor 1 of the first embodiment taken along the line A-A in FIG. 1.

FIG. 1 is a perspective view of a wiper motor 1 of the first embodiment. FIG. 2 is a cross-sectional view of the wiper motor 1 of the first embodiment taken along the line A-A in FIG. 1. The wiper motor 1 is a brushless wiper motor.

As shown in FIG. 1 and FIG. 2, the wiper motor 1, for example, is a drive source of a wiper equipped in a vehicle. The wiper motor 1 includes a motor portion (motor) 2, a deceleration portion 3 that decelerates and outputs a rotation of the motor portion 2, and a controller portion 4 that performs a driving control of the motor portion 2.

Moreover, in the following description, a rotation axis direction of a shaft 31 of the motor portion 2 is simply referred to as an axial direction; a circumferential direction of the shaft 31 is simply referred to as a circumferential direction; and a radial direction of the shaft 31 is simply referred to as a radial direction.

(Motor Portion)

The motor portion 2 includes a motor case 5, a substantially cylindrical stator 8 accommodated in the motor case 5, and a rotor 9 provided inside the stator 8 in the radial direction and rotatable with respect to the stator 8. The motor portion 2 is a so-called brushless motor that does not require a brush when supplying electric power to the stator 8.

(Motor Case)

The motor case 5, for example, is formed of a material having excellent heat dissipation, such as a die-cast aluminium. The motor case 5 includes a first motor case 6 and a second motor case 7 that are configured separable from each other in the axial direction. The first motor case 6 and the second motor case 7 are respectively formed into a bottomed tubular shape.

The first motor case 6 is integrally formed with a gear case 40 of the deceleration portion 3 such that a bottom portion 10 is joined to the gear case 40. A through hole 10a into which the shaft 31 of the rotor 9 can be inserted is formed in the substantial radial center of the bottom portion 10.

In addition, an outer flange portion 16 projecting outward in the radial direction is formed in an opening portion 6a of the first motor case 6, and an outer flange portion 17 projecting outward in the radial direction is formed in an opening portion 7a of the second motor case 7. The outer flange portions 16 and 17 engage with each other and form the motor case 5 that has an internal space. In addition, the stator 8 is disposed in the internal space of the motor case 5, so as to be internally fitted to the first motor case 6 and the second motor case 7.

(Stator)

Figure 3:
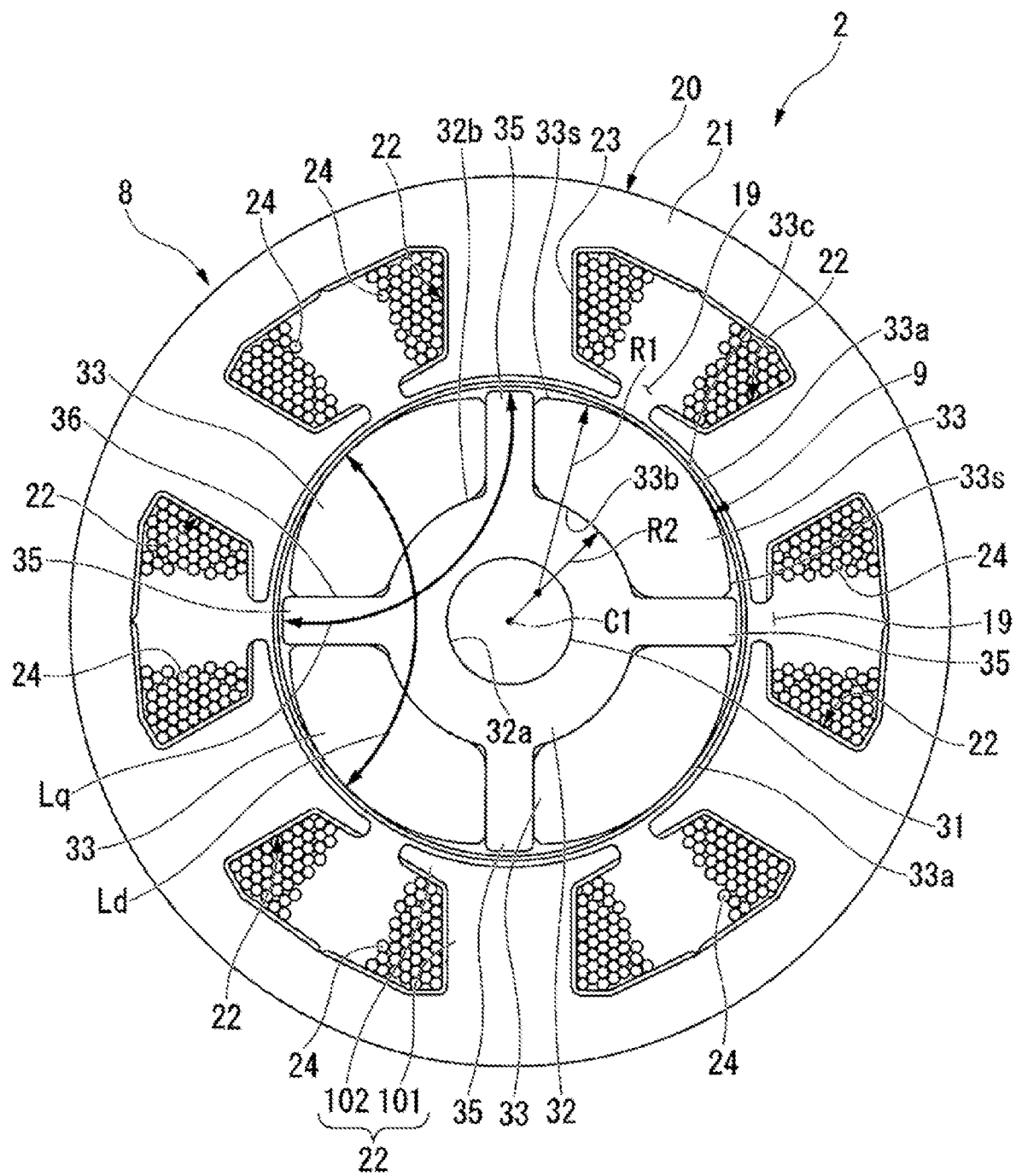
FIG. 3 is a plan view of the stator 8 and the rotor 9 of the first embodiment as viewed from the axial direction.

FIG. 3 is a plan view of the stator 8 and the rotor 9 of the first embodiment as viewed from the axial direction. In FIG. 3, Lq indicates the inductance [mH] of the q-axis of the rotor 9, and Ld indicates the inductance [mH] of the d-axis of the rotor 9. It is desirable that, the value of Lq is larger than the value of Ld.

As shown in FIG. 2 and FIG. 3, the stator 8 has a stator core 20 integrally formed of a tubular core portion 21 that has a substantially circular cross-sectional shape in the radial direction and a plurality of (e.g., six in the first embodiment) of teeth 22 that protrude inward from the core portion 21 in the radial direction. The stator core 20 has an annular shape.

The stator core 20 is formed by stacking a plurality of metal sheets in the axial direction. Moreover, the stator core 20 is not limited to being formed by stacking the plurality of metal sheets in the axial direction, and for example, may be formed by press-molding soft magnetic powder.

The teeth 22 are formed by integrally molding a teeth body 101 that protrudes in the radial direction from an inner circumferential surface of the core portion 21, and a collar portion 102 that extends in the circumferential direction from a radial inner end of the teeth body 101. The collar portion 102 is formed extending from the teeth body 101 to both sides in the circumferential direction. In addition, a slot 19 is formed between the collar portions 102 that are adjacent to each other in the circumferential direction.

In addition, the inner circumferential surface of the core portion 21 and the teeth 22 are covered with an insulator 23 made of a resin. A coil 24 is wound around each of the teeth 22 from above the insulator 23. Each coil 24 generates a magnetic field for rotating the rotor 9 by using an electric power supplied from the controller portion 4.

(Rotor)

The rotor 9 is rotatably provided inside the stator 8 in the radial direction with a minute gap between the stator 8 and itself. The rotor 9 includes the shaft 31 that is integrally formed with a worm shaft 44 (see FIG. 2) configuring the deceleration portion 3, a substantially column-shaped rotor core 32 that is externally fitted and fixed to the shaft 31 and has the shaft 31 as an axle center (rotation axis) C1, and four magnets 33 provided on an outer circumferential surface of the rotor core 32. As a result, in the motor portion 2, a ratio of the number of magnetic poles of the magnets 33 to the number of slots 19 (teeth 22) is 4:6.

The rotor core 32 is formed by stacking a plurality of metal sheets in the axial direction. Furthermore, the rotor core 32 is not limited to being formed by stacking the plurality of metal sheets in the axial direction, and for example, may be formed by press-molding soft magnetic powder.

In addition, a through hole 32a penetrating in the axial direction is formed in the substantial radial center of the rotor core 32. The shaft 31 is press-fitted into the through hole 32a, which means that the axle center C1 is located in the radial center of the rotor core 32. Moreover, the shaft 31 may be inserted into the through hole 32a, and the rotor core 32 may be externally fitted and fixed to the shaft 31 by using an adhesive or the like.

Furthermore, four salient poles 35 are provided on an outer circumferential surface 32b of the rotor core 32 at equal intervals in the circumferential direction. The salient poles 35 are formed to protrude outward in the radial direction and fully extend in the axial direction of the rotor core 32.

The outer circumferential surface 32b of the rotor core 32 formed as described above is configured such that an interval between two salient poles 35 adjacent to each other in the circumferential direction serves as a magnet accommodation portion 36. The magnet 33 is disposed in each magnet accommodation portion 36 and is fixed to the rotor core 32 with, for example, an adhesive or the like.

Figure 4:
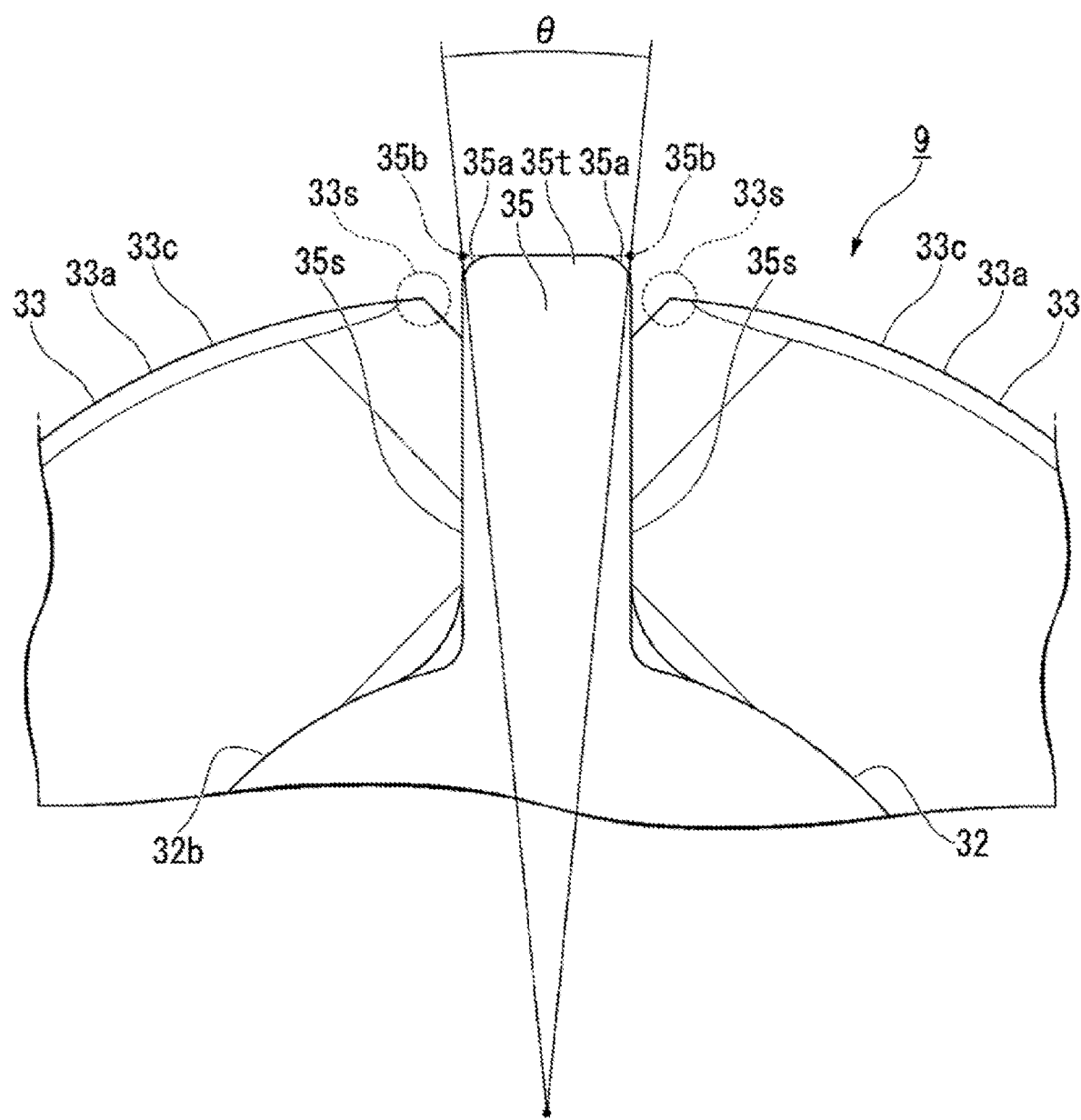
FIG. 4 is an enlarged view of the rotor 9 in the first embodiment.

FIG. 4 is an enlarged view of the rotor 9 of FIG. 3.

As shown in FIG. 3 and FIG. 4, the magnet 33 is formed such that the radial thickness of an end portion 33s, which is on both sides of the magnet 33 around the axle center C1 of the shaft 31 in the circumferential direction, is smaller than the radial thickness of a circumferential intermediate portion 33c. That is, as shown in detail in FIG. 4, a radius of curvature R1 on the outer circumferential surface 33a on the radial outside of the magnet 33 is set to be smaller than a radius of curvature R2 on the inner circumferential surface on the radial inside of the magnet 33. Therefore, a minute gap between the outer circumferential surface 33a on the radial outside of the magnet 33 and the inner circumferential surface of the teeth 22 is the smallest in the circumferential center of the magnet 33, and gradually increases as separating from the circumferential center in the circumferential direction.

In addition, the magnet 33 is a ferrite magnet. The magnet 33 is magnetized to have a magnetization orientation (magnetic field) that is parallel along a thickness direction. The magnets 33 are disposed to have the magnetic poles that differ from each other in the circumferential direction. In addition, the salient pole 35 of the rotor core 32 is located between the magnets 33 adjacent to each other in the circumferential direction, that is, at a boundary (pole boundary) of the magnetic pole.

A circumferential width dimension at an end portion 35t on the radial outside of the salient pole 35 is set to have an electrical angle θ that is greater than or equal to 20 degrees and less than or equal to 40 degrees.

Moreover, the circumferential width dimension at the end portion 35t on the radial outside of the salient pole 35 is a width dimension between two circumferential corner portions 35b supposing that round chamfered portions 35a are not formed on the salient pole 35. In the following description, the circumferential width dimension at the end portion 35t on the radial outside of the salient pole 35 is simply referred to as a radial width dimension of the salient pole 35.

Furthermore, it is preferable that facing surfaces 35s, which are on both sides of the salient pole 35 in the circumferential direction and face the circumferential end portions 33s of the magnet 33, are formed in parallel with each other.

The salient pole 35 protrudes further outward than the circumferential end portion 33s of the magnet 33 in the radial direction.

(Deceleration Portion)

Returning to FIG. 1 and FIG. 2, the deceleration portion 3 includes a gear case 40 on which the motor case 5 is mounted, and a worm deceleration mechanism 41 accommodated in the gear case 40. The gear case 40, for example, is formed of a material having excellent heat dissipation, such as a die-cast aluminium. The gear case 40 is formed in a box shape having an opening portion 40a on one surface, and has a gear accommodation portion 42 accommodating the worm deceleration mechanism 41. In addition, an opening portion 43 that provides communication between the through hole 10a of the first motor case 6 and the gear accommodation portion 42 is formed on a side wall 40b of the gear case 40 at a place where the first motor case 6 is integrally formed.

Furthermore, three fixing brackets 54a, 54b, and 54c are integrally molded on the side wall 40b of the gear case 40. The fixing brackets 54a, 54b, and 54c are for fixing the wiper motor 1 to a vehicle body or the like (not shown). The three fixing brackets 54a, 54b, and 54c are disposed at substantially equal intervals in the circumferential direction to avoid the motor portion 2. An anti-vibration rubber 55 is mounted on each of the fixing brackets 54a, 54b, and 54c. The anti-vibration rubber 55 is for preventing vibration when driving the wiper motor 1 from being transmitted to a vehicle body (not shown).

Also, a substantially cylindrical-shaped bearing boss 49 is provided protruding on a bottom wall 40c of the gear case 40. The bearing boss 49 is for rotatably supporting an output shaft 48 of the worm deceleration mechanism 41, and has a slide bearing (not shown) provided on an inner circumferential surface. Furthermore, an O-ring (not shown) is mounted on an inner circumferential edge of a tip of the bearing boss 49. As a result, dust and water are prevented from entering the inside from the outside through the bearing boss 49. In addition, a plurality of ribs 52 are provided on an outer circumferential surface of the bearing boss 49. As a result, the rigidity of the bearing boss 49 is ensured.

The worm deceleration mechanism 41 accommodated in the gear accommodation portion 42 is configured of a worm shaft 44 and a worm wheel 45 engaged with the worm shaft 44. The worm shaft 44 is coaxially disposed with the shaft 31 of the motor portion 2. In addition, both ends of the worm shaft 44 are rotatably supported by bearings 46 and 47 provided on the gear case 40. An end portion on the motor portion 2 side of the worm shaft 44 protrudes to reach the opening portion 43 of the gear case 40 through the bearing 46. The protruding end portion of the worm shaft 44 and an end portion of the shaft 31 of the motor portion 2 are joined together, and the worm shaft 44 and the shaft 31 are integrated with each other. Also, the worm shaft 44 and the shaft 31 may be integrally formed with each other by molding a worm shaft portion and a rotation axis portion with one base material.

The worm wheel 45 engaged with the worm shaft 44 is provided with an output shaft 48 in the radial center of the worm wheel 45. The output shaft 48 is coaxially disposed with a rotation axis direction of the worm wheel 45 and protrudes to the outside of the gear case 40 through the bearing boss 49 of the gear case 40. A spline 48a that can be connected to an electrical component (not shown) is formed on a protruding tip of the output shaft 48.

Furthermore, a sensor magnet (not shown) is provided in the radial center of the worm wheel 45 on a side that is opposite to a side where the output shaft 48 protrudes. The sensor magnet configures a part of a rotational position detection portion 60 that detects a rotational position of the worm wheel 45. A magnetic detection element 61, which configures another part of the rotational position detection portion 60, is provided in the controller portion 4 that is disposed facing the worm wheel 45 on the sensor magnet side of the worm wheel 45 (the opening portion 40a side of the gear case 40).

(Controller Portion)

Figure 5:
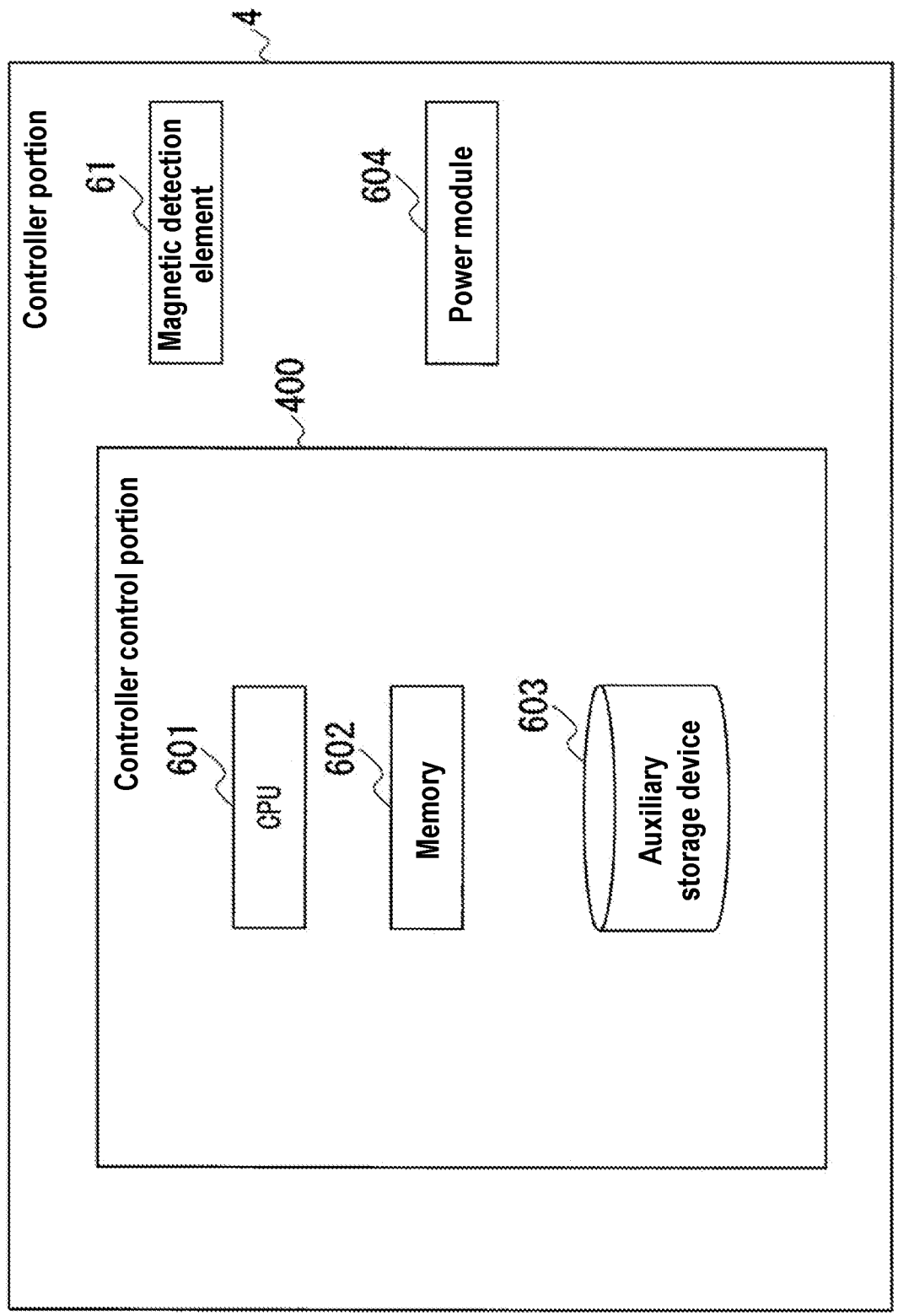
FIG. 5 is a view showing an example of a hardware configuration of the controller portion 4 in the first embodiment.

FIG. 5 is a view showing an example of a hardware configuration of the controller portion 4 in the first embodiment.

The controller portion 4 controlling the drive of the motor portion 2 includes a central processing unit (CPU) 601 connected by a bus, a memory 602 such as a random access memory (RAM) and a read only memory (ROM), an auxiliary storage device 603, the magnetic detection element 61, and a power module 604 including a switching element such as a field effect transistor (FET) or the like that controls the voltage applied to the coil 24. The central processing unit (CPU) 601 connected by the bus, the memory 602, and the auxiliary storage device 603 operate as a controller control portion 400 by operating in conjunction with each other.

The CPU 601, the memory 602, the auxiliary storage device 603, the magnetic detection element 61, and the power module 604 are mounted on a controller board 62.

The controller portion 4 includes a cover 63 that is provided to close the opening portion 40a of the gear case 40. The controller board 62 is disposed facing the sensor magnet side of the worm wheel 45 (the opening portion 40a side of the gear case 40).

The controller board 62 has a plurality of conductive patterns (not shown) formed on a so-called epoxy board. A terminal portion of the coil 24 pulled out from the stator core 20 of the motor portion 2 is connected to the controller board 62, and a terminal (not shown) of a connector 11 provided on the cover 63 is electrically connected to the controller board 62. Furthermore, a capacitor (not shown) or the like that soothes a voltage applied to the controller board 62 is mounted on the controller board 62.

The cover 63 that covers the controller board 62 configured as described above is made of a resin. Also, the cover 63 is formed to bulge slightly outward. In addition, an inner surface side of the cover 63 is configured as a controller accommodation portion 56 that accommodates the controller board 62 and the like.

Moreover, the connector 11 is integrally formed on an outer circumferential portion of the cover 63. The connector 11 is formed capable of being fitted to a connector extending from an external power supply (not shown). In addition, the controller board 62 is electrically connected to the terminal (not shown) of the connector 11. As a result, electric power from the external power supply is supplied to the controller board 62.

Furthermore, a fitting portion 81 fitted to an end portion of the side wall 40b of the gear case 40 is formed to protrude on an opening edge of the cover 63. The fitting portion 81 is configured of two walls 81a and 81b along the opening edge of the cover 63. In addition, the end portion of the side wall 40b of the gear case 40 is inserted (fitted) between the two walls 81a and 81b. As a result, a labyrinth portion 83 is formed between the gear case 40 and the cover 63. The labyrinth portion 83 prevents dust and water from entering between the gear case 40 and the cover 63. Also, fixation of the gear case 40 and the cover 63 is performed by fastening bolts (not shown).

Figure 6:
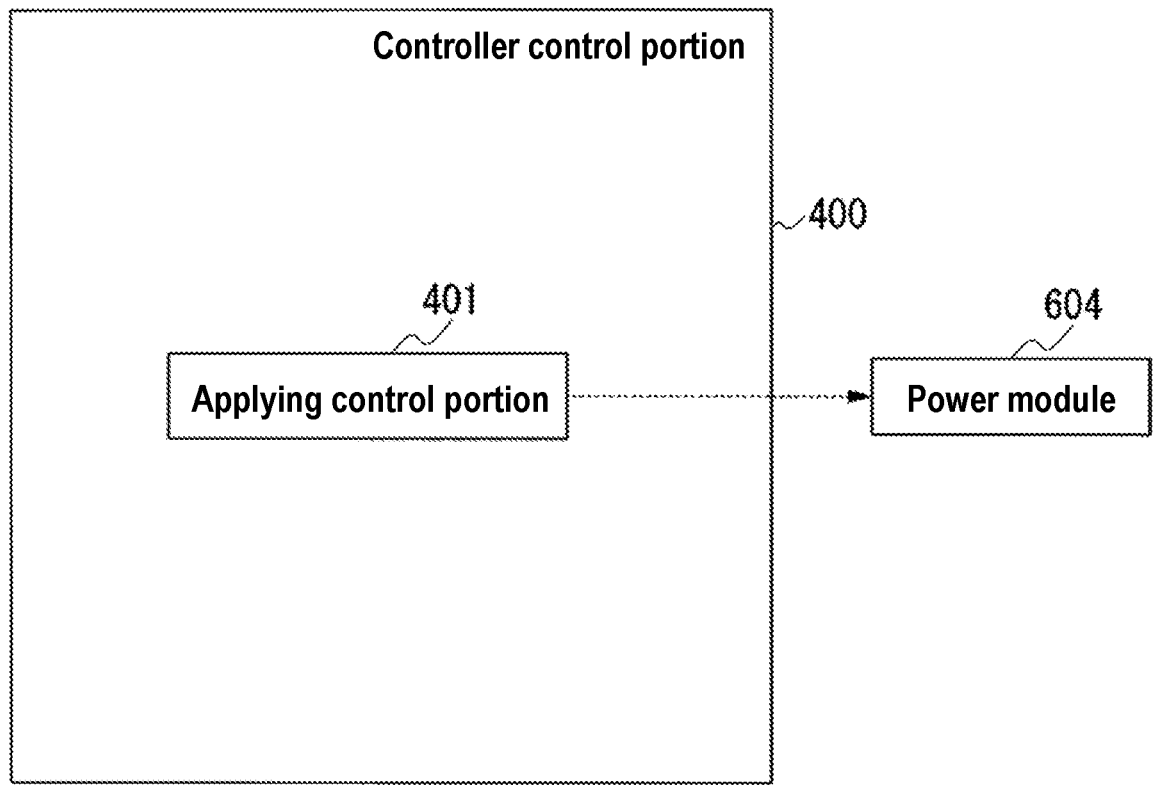
FIG. 6 is an explanatory view illustrating an example of a functional configuration of the controller control portion 400 in the first embodiment.

FIG. 6 is a view showing an example of a functional configuration of the controller control portion 400 in the first embodiment.

An applying control portion 401 controls the power module 604 to apply a predetermined voltage to the coil 24.

The voltage applied to the coil 24 by the control of the applying control portion 401 may be any voltage that satisfies the following conditions (hereinafter referred to as voltage conditions). The first condition is that the waveform is a rectangular wave. The second condition is that voltage application to the coil 24 is started when a tip of the salient pole 35 and an opening portion of the teeth 22 do not face each other.

The voltage satisfying the voltage conditions, for example, has a waveform that is a rectangular wave, an advance angle that is a predetermined advance angle among advance angles greater than or equal to 15 degrees and less than or equal to 45 degrees, and a conduction angle that is a predetermined conduction angle among conduction angles greater than or equal to 130 degrees and less than or equal to 150 degrees. In the case where the voltage as described above is applied to the coil 24, the voltage rises as the voltage application is started. In the case where the voltage as described above is applied to the coil 24, the voltage is applied to the coil 24 when the tip of the salient pole 35 and the opening portion of the teeth 22 face each other.

Figure 7:
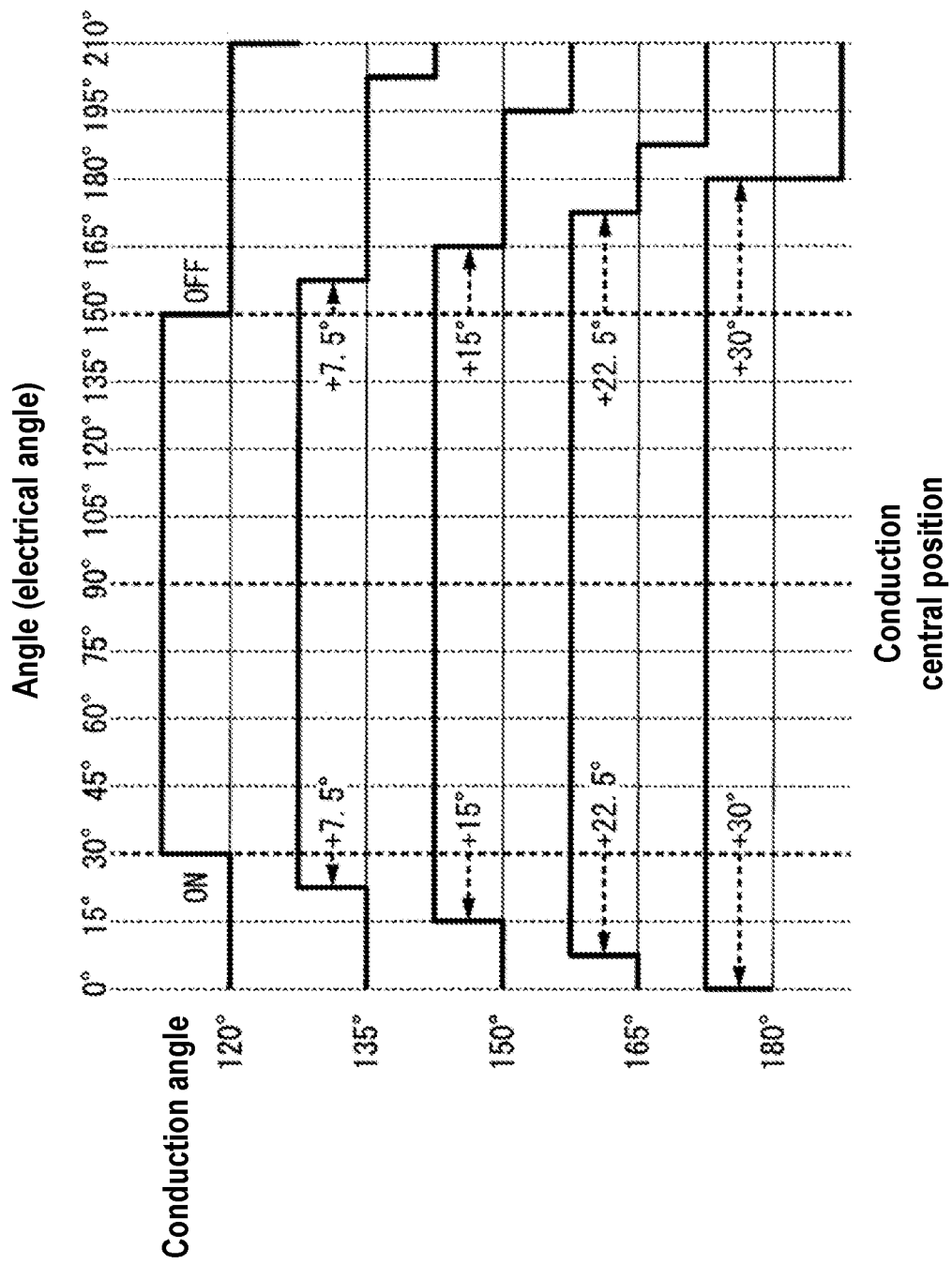
FIG. 7 is an explanatory view illustrating an advance angle and a conduction angle of the wiper motor 1 in which the voltage applied to the coil 24 is a rectangular wave in the first embodiment.

FIG. 7 is an explanatory view illustrating an advance angle and a conduction angle of the wiper motor 1 in which the voltage applied to the coil 24 is a rectangular wave in the first embodiment.

A magnitude of electrical angles from the rise of the voltage to the fall of the voltage is the conduction angle. An electrical angle in the middle of electrical angles of the rise of the voltage and electrical angles of the fall of the voltage is called a conduction central position. The advance angle represents a difference between an electrical angle at a rising position of the voltage and a predetermined electrical angle. The predetermined electrical angle is an electrical angle at the rising position of the voltage at which an induced voltage of the wiper motor 1 and a flowing phase of the coil 24 coincide with each other. The voltage at which the induced voltage of the wiper motor 1 and the flowing phase of the coil 24 coincide with each other has a conduction angle of 120 degrees and an electrical angle of 30 degrees at the rising position of the voltage.

Figure 8:
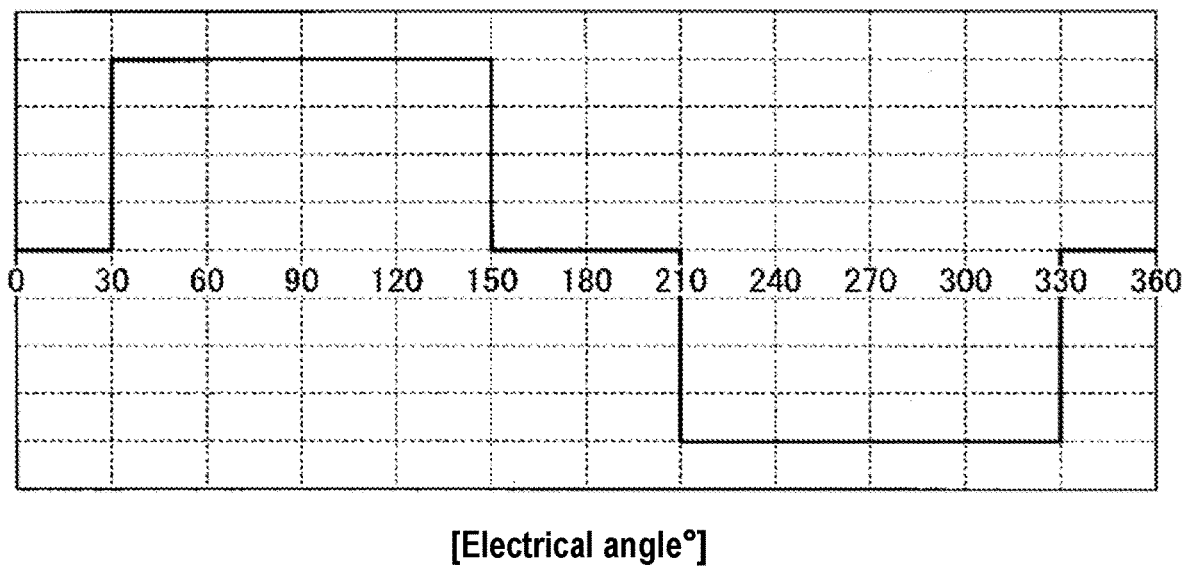
FIG. 8 is a view showing an example of the voltage applied to the coil 24 in the first embodiment.

FIG. 8 is a view showing an example of the voltage applied to the coil 24 in the first embodiment.

The voltage of FIG. 8 has a waveform that is a rectangular wave, an advance angle of 0 degrees, and a conduction angle of 120 degrees.

(Operation of Wiper Motor)

Next, the operation of the wiper motor 1 is described.

In the wiper motor 1, the electric power supplied to the controller board 62 through the connector 11 is selectively supplied to each coil 24 of the motor portion 2 through the power module 604. The controller board 62 superimposes a fifth harmonic on the drive voltage of the coil 24.

As a result, a predetermined interlinking magnetic flux is formed in the stator 8 (teeth 22), and a magnetic attractive or repulsive force is generated between the interlinking magnetic flux and an effective magnetic flux formed by the magnets 33 of the rotor 9. As a result, the rotor 9 continuously rotates.

When the rotor 9 rotates, the worm shaft 44 integrated with the shaft 31 rotates, and the worm wheel 45 engaged with the worm shaft 44 also rotates. Moreover, the output shaft 48 connected to the worm wheel 45 rotates, and an intended electrical component is driven.

In addition, a rotational position detection result of the worm wheel 45 detected by the magnetic detection element 61 mounted on the controller board 62 is output as a signal to an external device (not shown). In the external device (not shown), a switching timing of a switching element (not shown) and the like of the power module 604 is controlled based on a rotational position detection signal of the worm wheel 45, and the driving control of the motor portion 2 is performed. Also, an output of a driving signal of the power module 604 and the driving control of the motor portion 2 are performed by the controller portion 4.

(Function and Effect of Rotor)

Next, the function and effect of the rotor 9 are described with reference to FIG. 9 to FIG. 14. In the descriptions of FIG. 9 to FIG. 14 and an experiment showing an experimental result, the waveform of the voltage applied to the coil 24 is a rectangular wave.

Figure 9:
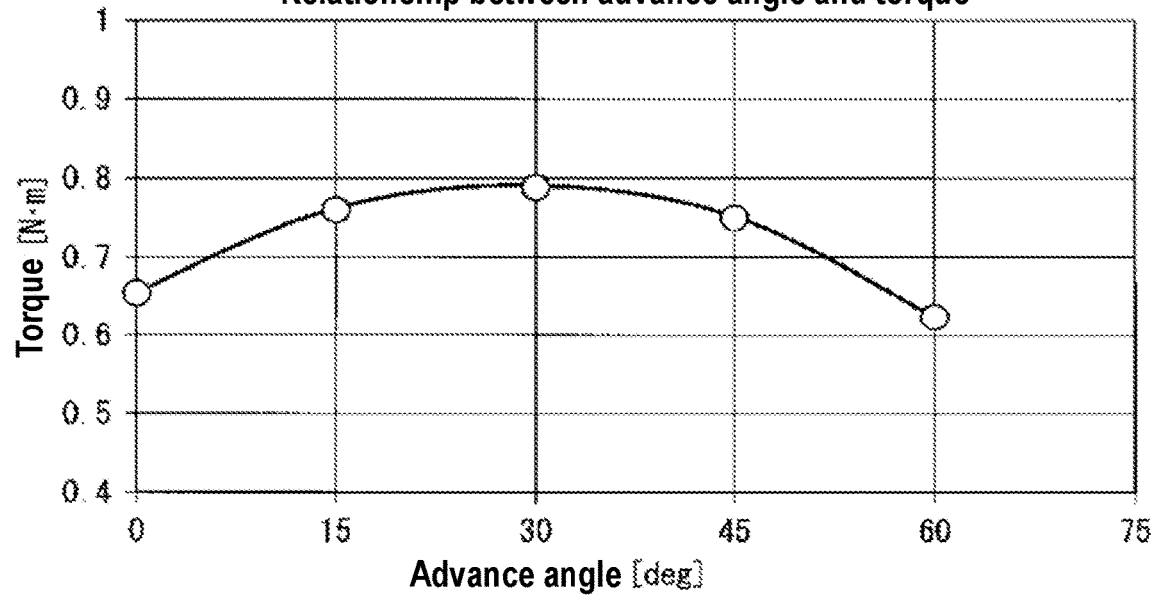
FIG. 9 is an experimental result showing a relationship between an advance angle and a maximum value of a combined torque of the wiper motor 1 of the first embodiment.

FIG. 9 is an experimental result showing a relationship between an advance angle and a maximum value of a combined torque of the wiper motor 1 of the first embodiment. The combined torque is a total torque of a reluctance torque and a magnet torque.

The horizontal axis of FIG. 9 represents the advance angle. The vertical axis of FIG. 9 represents the maximum value of the combined torque at each advance angle. FIG. 9 shows that the combined torque is at a maximum when the advance angle is 30 degrees.

Figure 10:
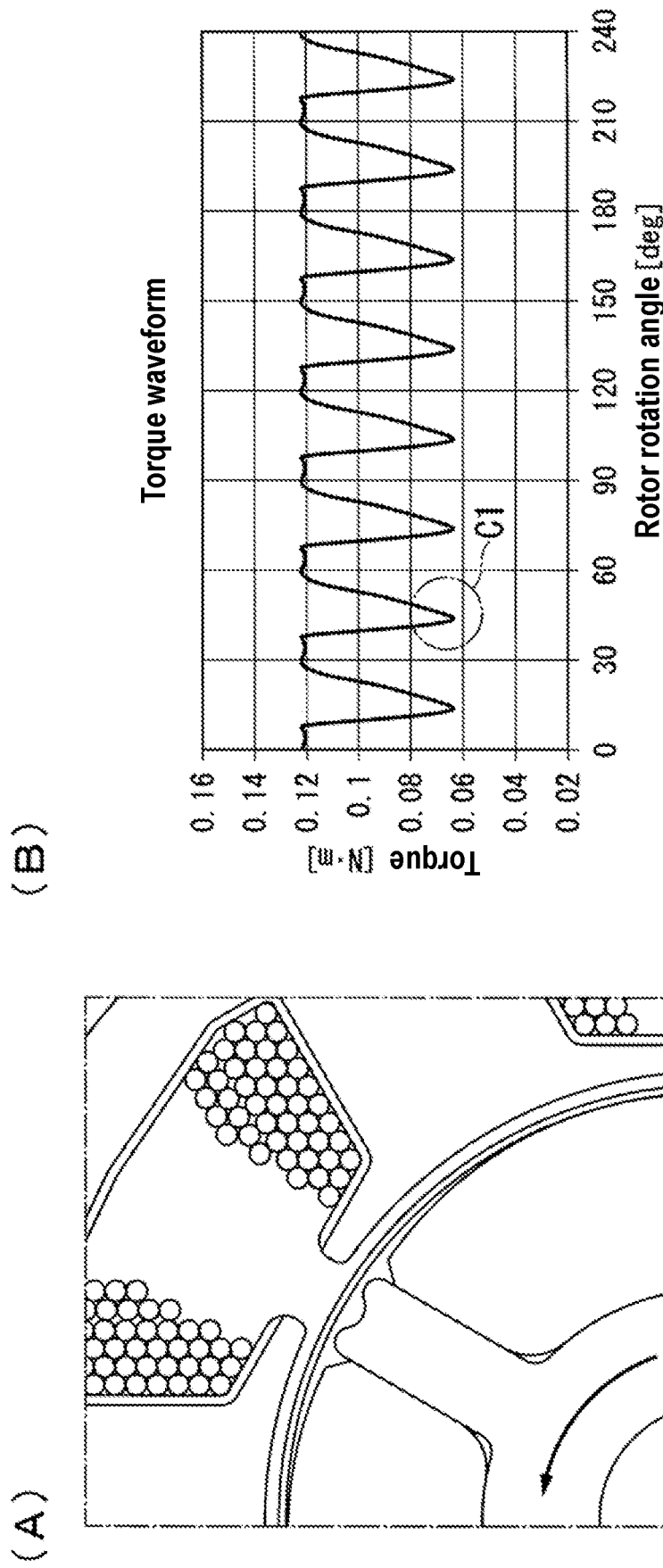
FIG. 10 is an explanatory view illustrating a relationship between an advance angle and a positional relationship between the tip of the salient pole 35 and the opening portion of the teeth of the first embodiment.

FIG. 10 is an explanatory view illustrating a relationship between an advance angle and a positional relationship between the tip of the salient pole 35 and the opening portion of the teeth 22 of the first embodiment.

(A) of FIG. 10 shows the positional relationship between the tip of the salient pole 35 and the opening portion of the teeth 22 during the rise of the voltage of the rectangular wave with the advance angle of 30 degrees and the conduction angle of 120 degrees. When the voltage of the rectangular wave with the advance angle of 30 degrees and the conduction angle of 120 degrees rises, the tip of the salient pole 35 and the opening portion of the teeth 22 face each other. Since the reluctance torque is generated when the voltage rises, in the case where the rectangular wave with the advance angle of 30 degrees and the conduction angle of 120 degrees is applied to the coil 24, the reluctance torque is generated when the tip of the salient pole 35 and the opening portion of the teeth 22 face each other.

(B) of FIG. 10 is an experimental result of a waveform of the combined torque when the voltage of the rectangular wave with the advance angle of 30 degrees and the conduction angle of 120 degrees is applied to the coil 24. The combined torque represented by C1 in (B) of FIG. 10 is a combined torque generated at a position where the tip of the salient pole 35 and the opening portion of the teeth 22 face each other. As shown in (B) of FIG. 10, if the position where the tip of the salient pole 35 and the opening portion of the teeth 22 face each other is the rising position of the voltage, the combined torque suddenly increases. The greater the amount of change in the combined torque, the greater the ripples and noises. Therefore, if the amount of change in the combined torque can be reduced, the occurrence of ripples and noises can be suppressed.

Figure 11:
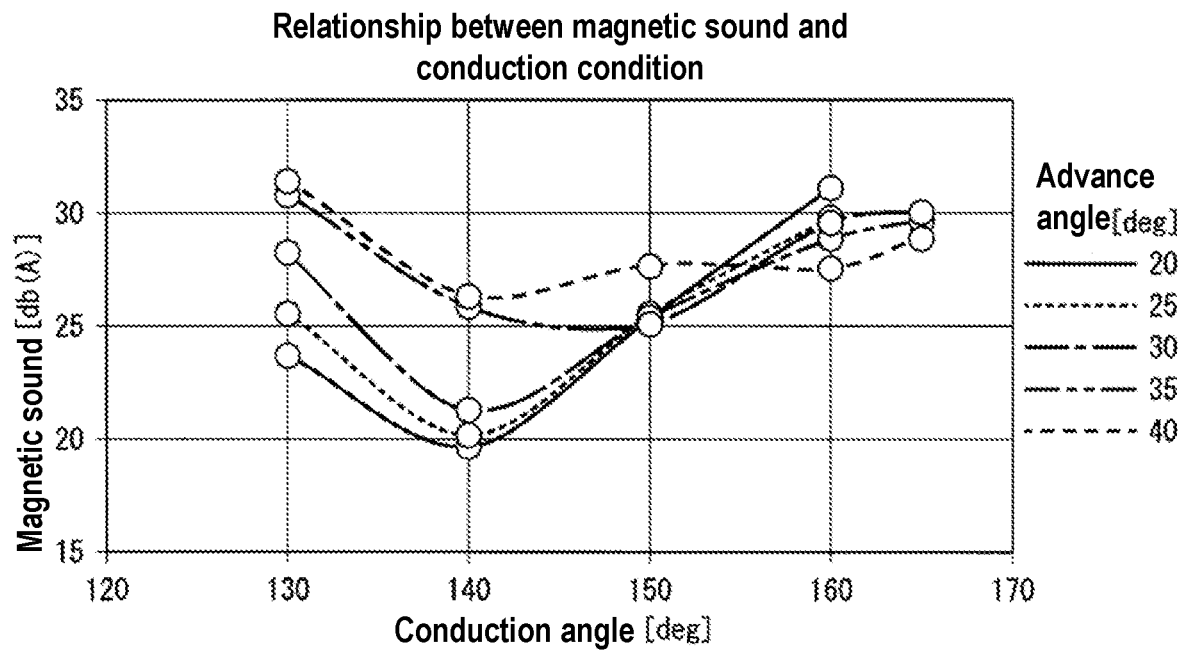
FIG. 11 is an experimental result showing a relationship between an advance angle and a conduction angle and a magnetic sound of the wiper motor 1 of the first embodiment.

FIG. 11 is an experimental result showing a relationship between an advance angle and a conduction angle and a magnetic sound of the wiper motor 1 of the first embodiment.

The horizontal axis of FIG. 11 represents the conduction angle. The vertical axis of FIG. 11 represents the loudness of the magnetic sound. The loudness of the magnetic sound is the loudness of the noise generated by the wiper motor 1. FIG. 11 shows the relationship between the conduction angle and the magnetic sound at each advance angle of 20 degrees, 25 degrees, 30 degrees, 35 degrees, and 40 degrees. FIG. 11 shows that when the advance angle is other than 35 degrees, the loudness of the magnetic sound is at a minimum when the conduction angle is 140 degrees. FIG. 11 shows that when the advance angle is 35 degrees, the loudness of the magnetic sound is at a minimum when the conduction angle is 150 degrees. FIG. 11 shows that the loudness of the magnetic sound when the advance angle is 35 degrees and the conduction angle is 140 degrees is greater than but substantially the same as the loudness of the magnetic sound when the advance angle is 35 degrees and the conduction angle is 150 degrees.

In addition, FIG. 11 shows that when the conduction angle is 140 degrees, the loudness of the magnetic sound is at a minimum when the advance angle is 20 degrees. FIG. 11 shows that the loudness of the magnetic sound when the advance angle is 25 degrees and the conduction angle is 140 degrees and the loudness of the magnetic sound when the advance angle is 30 degrees and the conduction angle is 140 degrees are substantially the same as the loudness of the magnetic sound when the advance angle is 20 degrees and the conduction angle is 140 degrees. That is, FIG. 11 shows that to reduce the magnetic sound, it is preferable that the advance angle is greater than or equal to 20 degrees and less than or equal to 30 degrees, and the conduction angle is 140 degrees. As described above, FIG. 11 shows that the magnetic sound is small when the advance angle is greater than or equal to 20 degrees and less than or equal to 30 degrees, and the conduction angle is 140 degrees.

As described above, the magnetic sound reduces when the advance angle is greater than or equal to 20 degrees and less than or equal to 30 degrees and the conduction angle is 140 degrees since the rise of the voltage is not at the position of the electrical angle of 30 degrees, and is not at the position where the tip of the salient pole 35 and the opening portion of the teeth 22 face each other.

Moreover, the experimental result of FIG. 11 shows that the magnetic sound is loud when the conduction angle is greater than or equal to 150 degrees. As described above, the magnetic sound becomes loud because a consumption current increases, which is different from the reason of the torque.

Figure 12:
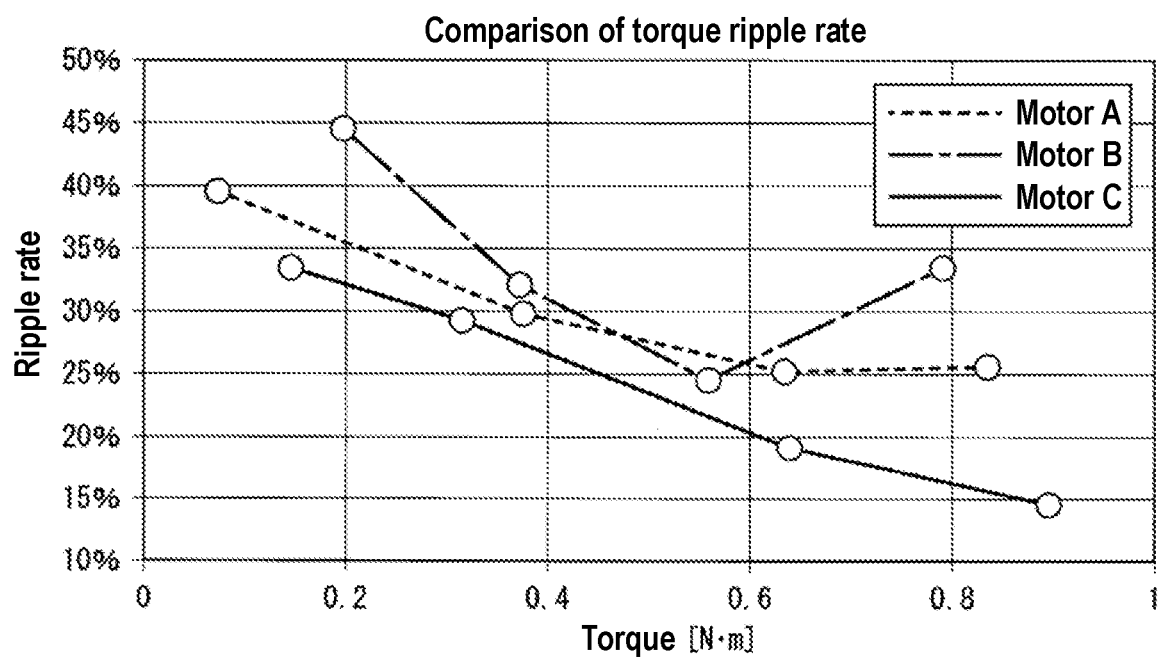
FIG. 12 is an experimental result showing a frequency of the occurrence of torque ripples generated in the wiper motor 1 of the first embodiment.

FIG. 12 is an experimental result showing a frequency of the occurrence of torque ripples (hereinafter referred to as a "ripple rate") generated in the wiper motor 1 of the first embodiment.

The horizontal axis of FIG. 12 represents the magnitude of the combined torque of the rotor 9. The vertical axis of FIG. 12 represents the ripple rate.

In FIG. 12, a motor A shows a surface permanent magnet (SPM) motor that does not have the salient pole 35. In FIG. 12, a motor B shows the wiper motor 1 driven by the rectangular wave with the advance angle of 30 degrees and the conduction angle of 120 degrees.

In FIG. 12, a motor C shows the wiper motor 1 driven by the rectangular wave with the advance angle greater than or equal to 20 degrees and less than or equal to 30 degrees and the conduction angle of 130 degrees to 150 degrees.

FIG. 12 shows that the motor C has a lower ripple rate than the motor A and the motor B.

Furthermore, FIG. 12 shows that the torque ripples decrease even if the combined torque increases in the motor C.

Figure 13:
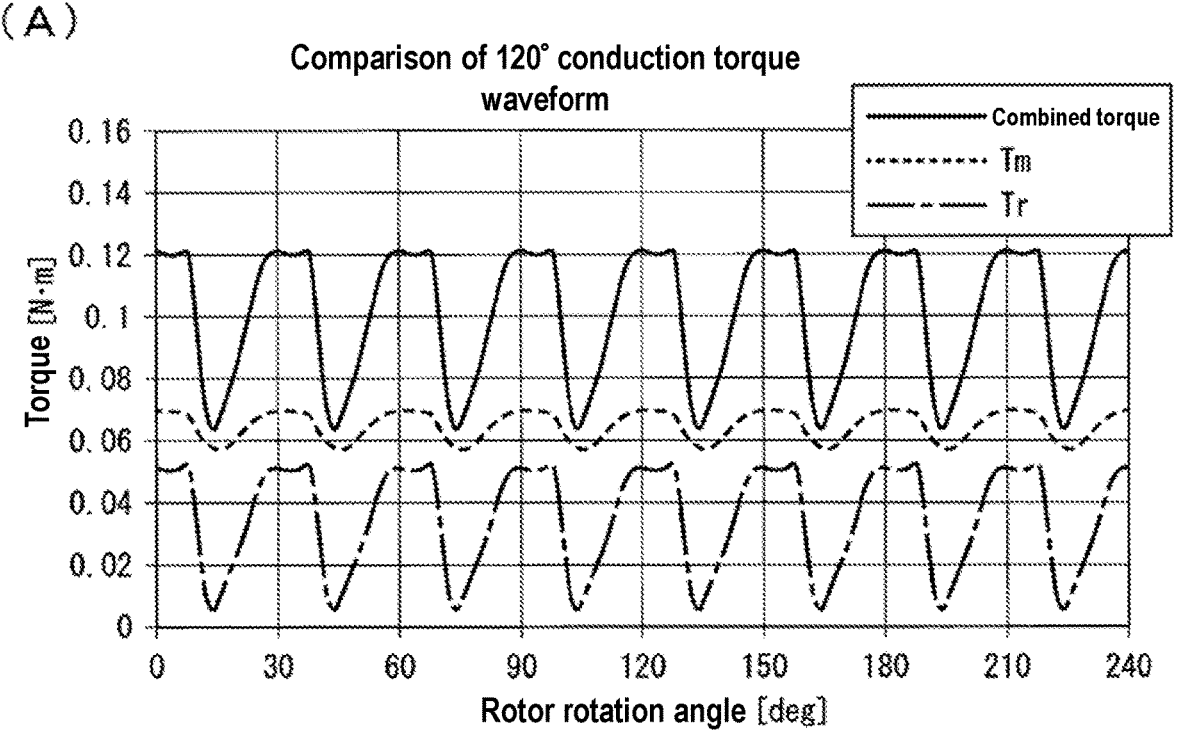
FIG. 13 is an experimental result showing a rotor rotation angle dependence of a magnet torque, a reluctance torque, and a combined torque of the wiper motor 1 of the first embodiment.
Figure 13:
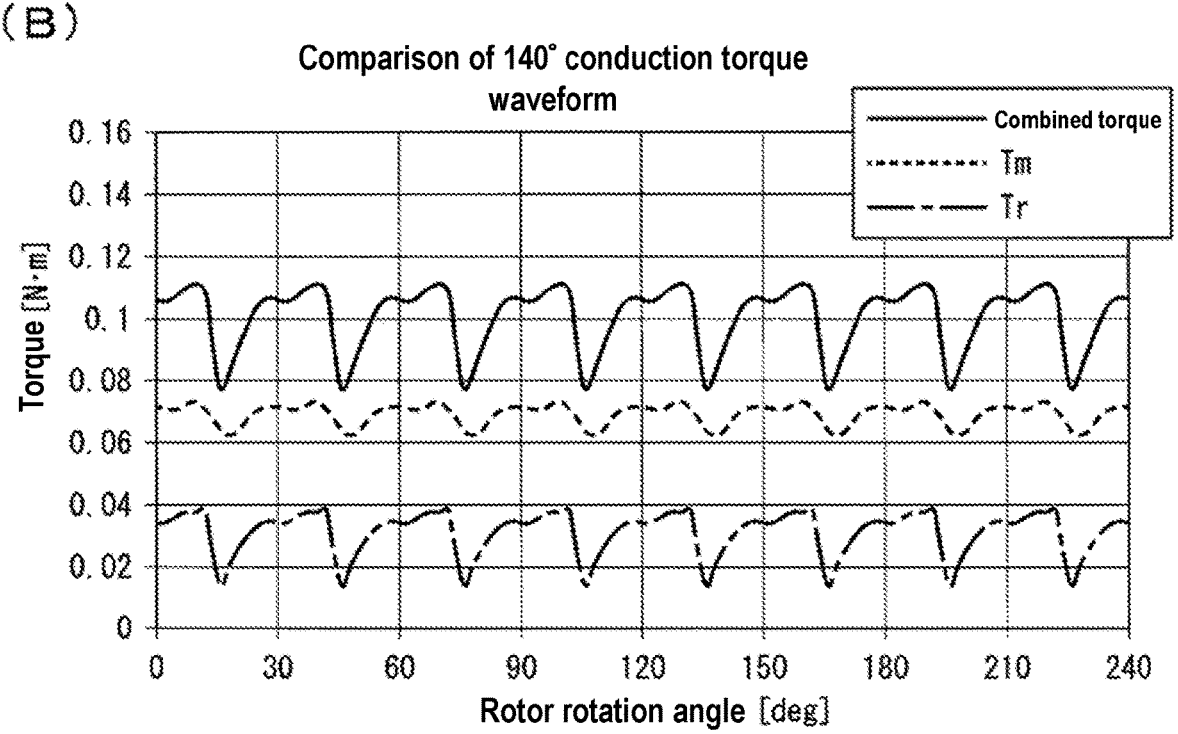

FIG. 13 is an experimental result showing a rotor rotation angle dependence of the magnitude of a magnet torque, the magnitude of a reluctance torque, and the magnitude of a combined torque of the wiper motor 1 of the first embodiment. In an experiment showing an experimental result of FIG. 13, the advance angle is 30 degrees.

The horizontal axis of FIG. 13 represents the rotation angle of the rotor. The vertical axis of FIG. 13 represents the magnitude of the torque.

(A) of FIG. 13 shows waveforms of the torques when the conduction angle is 120 degrees. In (A) of FIG. 13, the amplitude of the magnet torque Tm is approximately 0.01 (Nm). In (A) of FIG. 13, the amplitude of the reluctance torque Tr is approximately 0.04 (Nm). In (A) of FIG. 13, the amplitude of the combined torque is approximately 0.05 (Nm).

(B) of FIG. 13 shows waveforms of the torques when the conduction angle is 140 degrees. In (B) of FIG. 13, the amplitude of the magnet torque Tm is approximately 0.01 (Nm). In (B) of FIG. 13, the amplitude of the reluctance torque Tr is approximately 0.02 (Nm). In (B) of FIG. 13, the amplitude of the combined torque is approximately 0.03 (Nm).

According to (A) of FIG. 13 and (B) of FIG. 13, the magnitude of the reluctance torque when the conduction angle is 140 degrees is smaller than the magnitude of the reluctance torque when the conduction angle is 120 degrees. That is, a sound generated by the reluctance torque when the conduction angle is 140 degrees is smaller than a sound generated by the reluctance torque when the conduction angle is 120 degrees.

As described above, the occurrence of the noise generated by the reluctance torque is more suppressed when the conduction angle is 140 degrees than when the conduction angle is 120 degrees.

Figure 14:
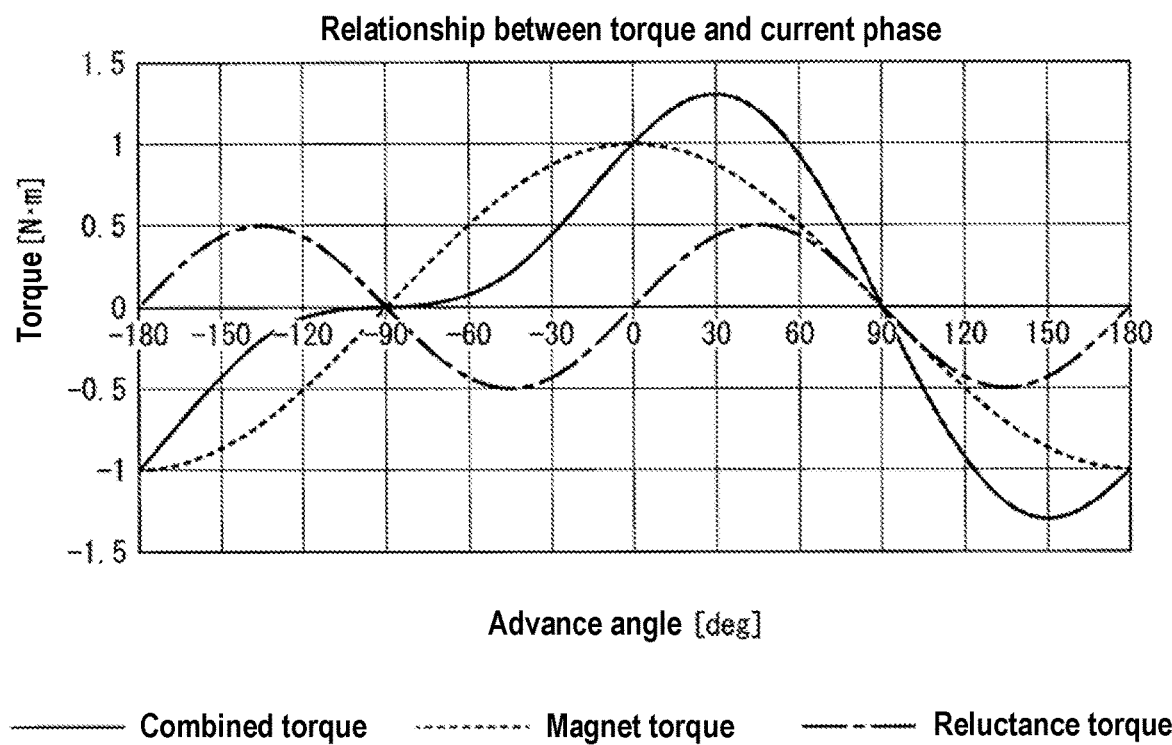
FIG. 14 is an explanatory view illustrating a relationship between an advance angle, a combined torque, a magnet torque, and a reluctance torque of the wiper motor 1 of the first embodiment.

FIG. 14 is an explanatory view illustrating a relationship between an advance angle, a combined torque, a magnet torque, and a reluctance torque of the wiper motor 1 of the first embodiment.

The horizontal axis of FIG. 14 represents the advance angle. The vertical axis of FIG. 14 represents the torques. FIG. 14 shows that the combined torque has a value close to the maximum value when the advance angle is greater than or equal to 15 degrees and less than 30 degrees. FIG. 14 shows that a ratio of the reluctance torque is smaller than a ratio of the magnet torque when the advance angle is greater than or equal to 15 degrees and less than 30 degrees. As described above, when the advance angle is greater than or equal to 15 degrees and less than 30 degrees, the ratio of the reluctance torque in the combined torque is small, but the combined torque is close to the maximum value. Therefore, even when a large torque is generated, the wiper motor 1 that operates by applying the voltage as described above to the coil 24 can suppress the occurrence of the ripples and noises generated by the reluctance torque.

The wiper motor 1 configured as described above includes the salient pole 35 that protrudes further outward than the circumferential end portion 33s of the magnet 33 in the radial direction. Furthermore, the wiper motor 1 configured as described above operates by applying the voltage having the waveform that is a rectangular wave, the advance angle that is a predetermined advance angle among the advance angles greater than or equal to 15 degrees and less than or equal to 45 degrees, and the conduction angle that is a predetermined conduction angle among the conduction angles greater than or equal to 130 degrees and less than or equal to 150 degrees. Therefore, the wiper motor 1 configured as described above can suppress the occurrence of ripples or noises.

In addition, the radial width dimension of the salient pole 35 of the motor portion 2 has the electrical angle $\theta$ that is greater than or equal to 20 degrees.

In the wiper motor 1 configured as described above, by setting the electrical angle $\theta$ of the salient pole 35 to be greater than or equal to 20 degrees to ensure that the radial width dimension is greater than or equal to a certain value, and thereby concentrating the magnetic flux in the salient pole 35, an effect of making a demagnetizing field difficult to act on the end portion 33s of the magnet 33 can be surely obtained. Furthermore, a high reluctance torque can be obtained by setting the electrical angle $\theta$ of the salient pole 35 to be greater than or equal to 20 degrees and less than or equal to 40 degrees.

Moreover, since in the motor portion 2, the magnetization orientation of the magnet 33 is parallel, cogging of the motor portion 2 can be suppressed and a high magnetic flux density can be obtained.

In the wiper motor 1 configured as described above, it is preferable that the advance angle is greater than or equal to 15 degrees and less than 30 degrees as shown by the experimental results of FIG. 9 to FIG. 14.

Second Embodiment

The advance angle and the conduction angle of the wiper motor may be changed by users.

Figure 15:
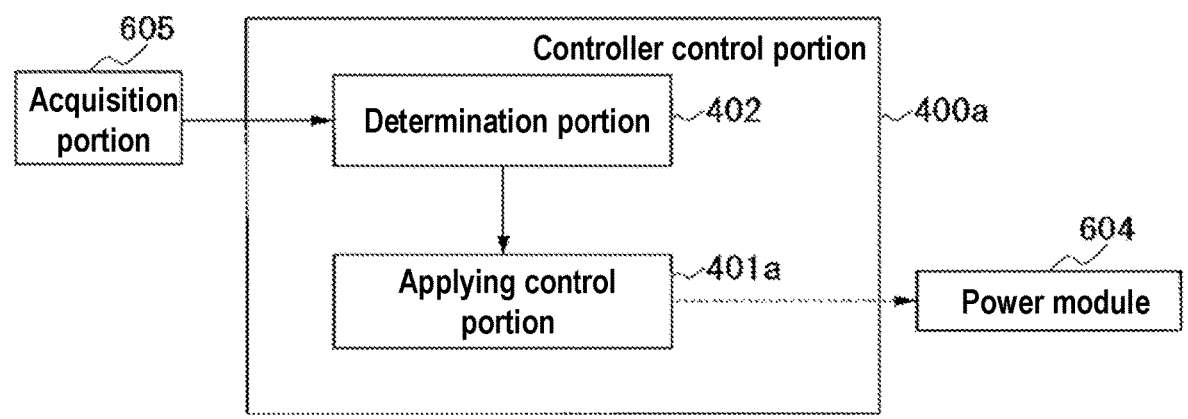
FIG. 15 is a view showing an example of a functional configuration of a controller control portion 400a included in a wiper motor 1a of the second embodiment.

FIG. 15 is a view showing an example of a functional configuration of a controller control portion 400a included in a wiper motor 1a of the second embodiment.

The wiper motor 1a of the second embodiment is different from the wiper motor 1 of the first embodiment in terms of including the controller control portion 400a instead of the controller control portion 400. Those having the same functions as those in FIG. 1 to FIG. 5 are designated by the same reference numerals, and the descriptions thereof are omitted.

The controller control portion 400a includes a determination portion 402 and an applying control portion 401a.

The determination portion 402 determines the advance angle and the conduction angle based on an operation environment information acquired by an acquisition portion 605. The operation environment information is information about the operation environment of the wiper motor 1a. The operation environment information may be any information about the operation environment of the wiper motor 1*a*.

The operation environment information, for example, may be an ambient volume. The operation environment information, for example, may be a time. The operation environment information, for example, may be an operation amount of an accelerator pedal of the vehicle on which the wiper motor 1 is mounted.

The acquisition portion 605 may be any component that can acquire the operation environment information. The acquisition portion 605, for example, may be the magnetic detection element 61. The acquisition portion 605 may be the accelerator pedal.

The acquisition portion 605, for example, may be a sound sensor. The acquisition portion 605 may be an optical sensor. The sound sensor or the optical sensor may be mounted anywhere in the wiper motor 1.

Furthermore, the acquisition portion 605 may be configured as an interface that connects an acquisition device of the operation environment information, such as the sound sensor and the like, to the device.

The applying control portion 401*a* applies the voltage with the advance angle and the conduction angle determined by the determination portion 402 to the coil 24.

When the operation environment information is information indicating the ambient volume, if the volume is higher than or equal to the predetermined volume, the determination portion 402, for example, determines the advance angle to 30 degrees and the conduction angle to 120 degrees. When the operation information is information indicating the ambient volume, if the volume is less than the predetermined volume, the determination portion 402, for example, determines the advance angle to 20 degrees and the conduction angle to 140 degrees. By applying the voltage with the advance angle and the conduction angle based on the volume to the coil 24 as described above, the drive of the wiper motor 1 becomes quiet when the surroundings are quiet, and prioritizes the occurrence of a high torque more than the quietness when the surroundings are noisy.

When the operation environment information is information indicating the amount of ambient light, if the amount of light is greater than or equal to the predetermined amount of light, the determination portion 402, for example, determines the advance angle to 30 degrees and the conduction angle to 120 degrees. When the operation information is information indicating the amount of ambient light, if the amount of light is less than the predetermined amount of light, the determination portion 402, for example, determines the advance angle to 20 degrees and the conduction angle to 140 degrees. Moreover, a case where the amount of light is less than the predetermined amount of light, for example, is night. By applying the voltage with the advance angle and the conduction angle based on the amount of light to the coil 24 as described above, the drive of the wiper motor 1 becomes quiet at night, and prioritizes the occurrence of a high torque more than the quietness during the daytime.

When the operation environment information is the operation amount of the accelerator pedal, if the operation amount is greater than or equal to the predetermined value, the determination portion 402, for example, determines the advance angle to 30 degrees and the conduction angle to 120 degrees. When the operation information is the operation amount of the accelerator pedal, if the operation amount is less than the predetermined value, the determination portion 402, for example, determines the advance angle to 20 degrees and the conduction angle to 140 degrees. By applying the voltage with the advance angle and the conduction angle based on the operation amount of the accelerator pedal to the coil 24 as described above, the drive of the wiper motor 1 becomes quiet when a moving speed of the vehicle is less than a predetermined speed, and prioritizes the occurrence of a high torque more than the quietness when the moving speed of the vehicle is greater than or equal to the predetermined speed.

As described above, since the wiper motor 1*a* of the second embodiment includes the determination portion 402, the wiper motor 1*a* can be operated according to the operation environment of the wiper motor.

(Variation)

A first variation of the rotor 9 (hereinafter referred to as a "rotor 9*a*") of the first embodiment and the second embodiment is described with reference to FIG. 16.

Figure 16:
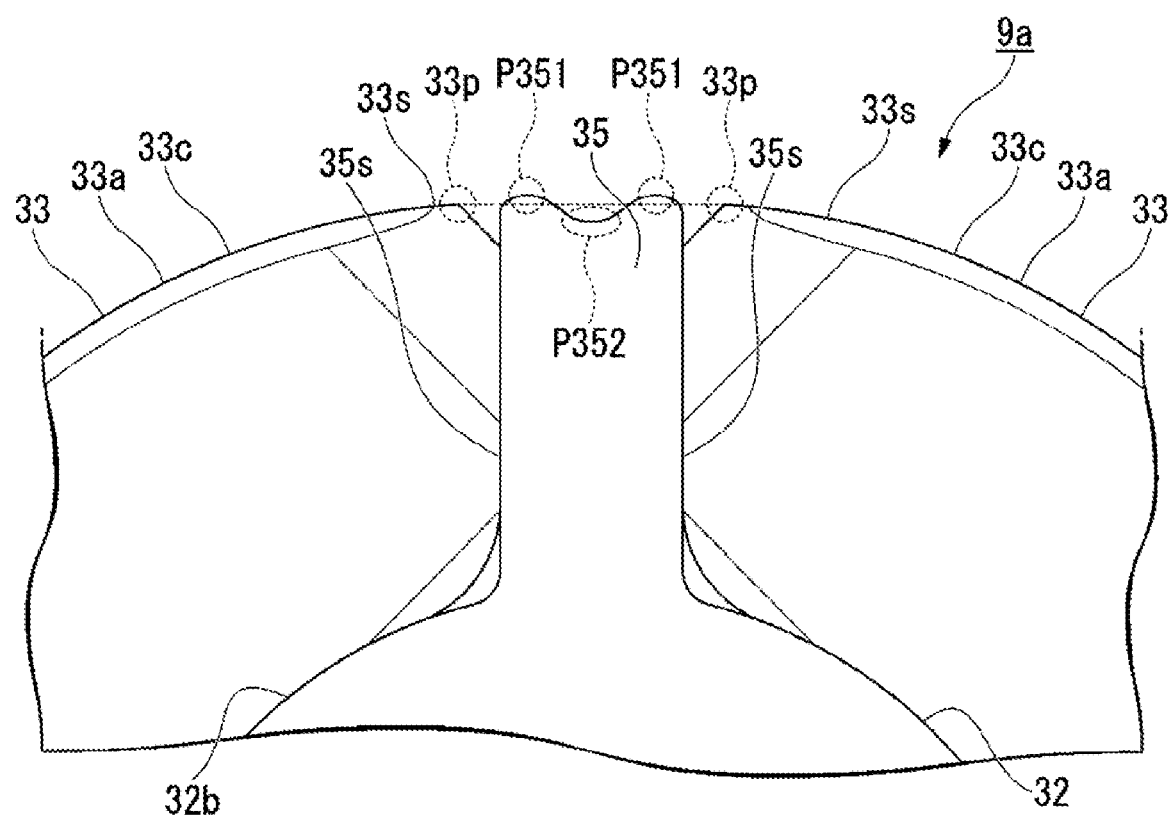
FIG. 16 is an enlarged view of a rotor 9a of a variation.

FIG. 16 is an enlarged view of the rotor 9*a* of the variation. FIG. 16 is a plan view of the rotor 9*a* as viewed from the axial direction, and corresponds to FIG. 4 of the first embodiment.

The rotor 9*a* is different from the rotor 9 of the first embodiment and the second embodiment in terms of having a convex portion and a concave portion on the outer circumferential surface in the radial direction of the end portion 35*t* of the salient pole 35. In FIG. 16, with respect to the straight line connecting the circumferential end portions 33*p* of the adjacent magnets, the convex portion on the outer circumferential surface in the radial direction of the end portion 35*t* of the salient pole 35 is a convex portion P351. In FIG. 16, with respect to the straight line connecting the circumferential end portions 33*p* of the adjacent magnets, the concave portion on the outer circumferential surface in the radial direction of the end portion 35*t* of the salient pole 35 is a concave portion P352.

A second variation of the rotor 9 (hereinafter referred to as a "rotor 9*b*") of the first embodiment and the second embodiment is described with reference to FIG. 17.

Figure 17:
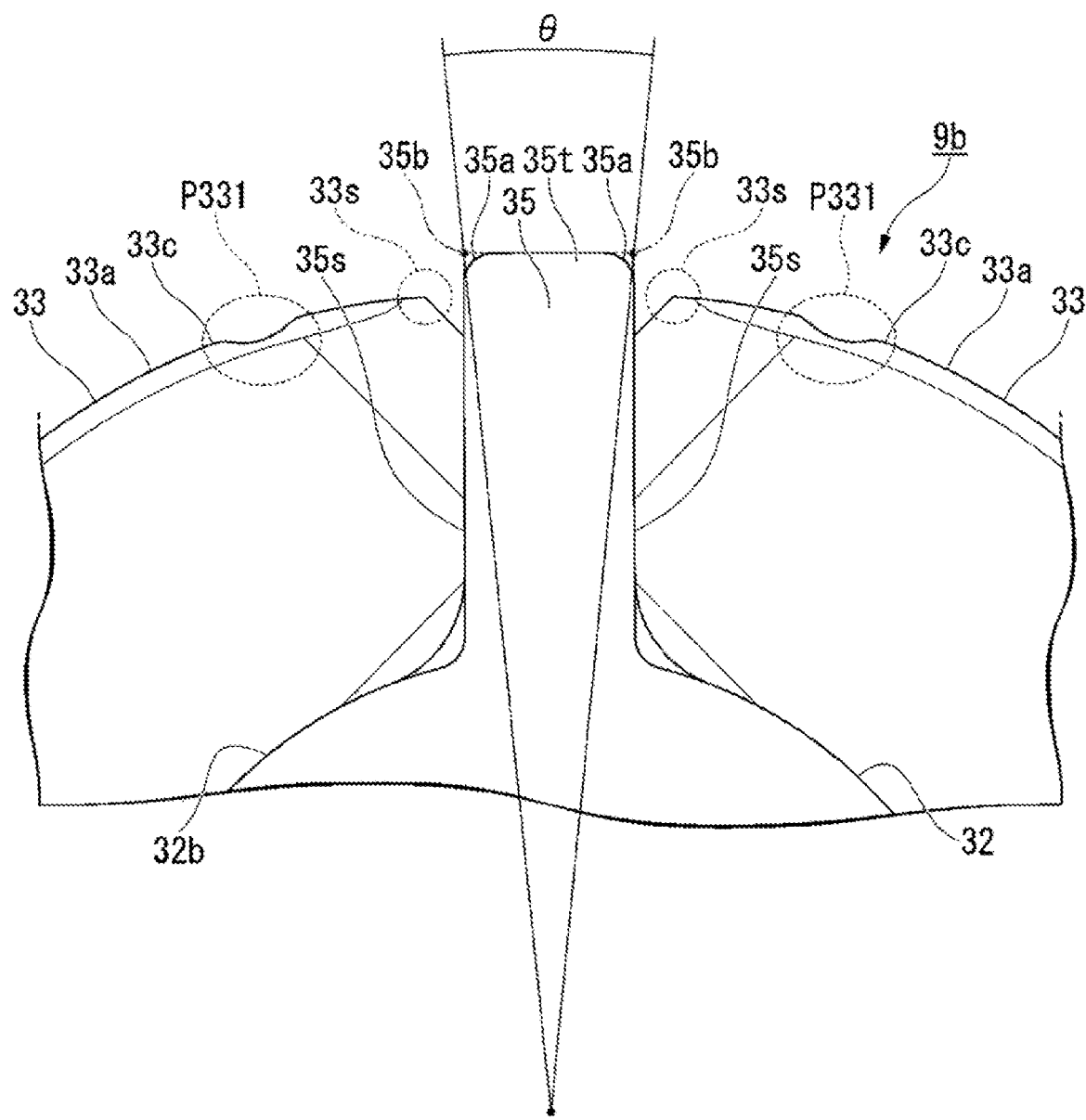
FIG. 17 is an enlarged view of a rotor 9b of a variation.

FIG. 17 is an enlarged view of the rotor 9*b* of the variation. FIG. 17 is a plan view of the rotor 9*b* as viewed from the axial direction, and corresponds to FIG. 4 of the first embodiment.

The rotor 9*b* is different from the rotor 9 of the first embodiment and the second embodiment in terms of a concave portion on the outer circumferential surface 33*a* on the radial outside of the magnet 33. In FIG. 17, the concave portion on the outer circumferential surface 33*a* on the radial outside of the magnet 33 is a concave portion P331.

A third variation of the rotor 9 (hereinafter referred to as a "rotor 9*c*") of the first embodiment and the second embodiment is described with reference to FIG. 18.

Figure 18:
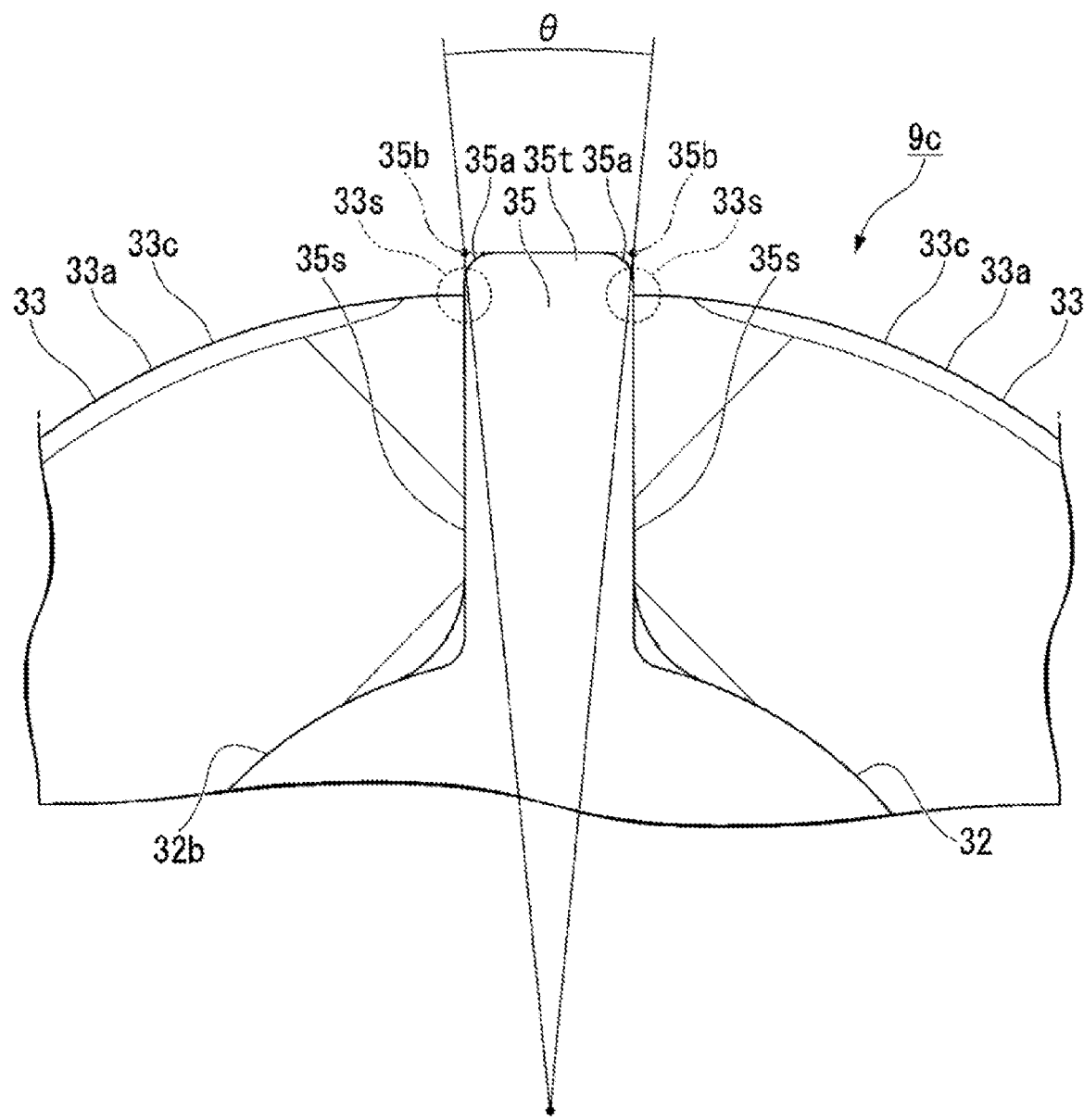
FIG. 18 is an enlarged view of a rotor 9c of a variation.

FIG. 18 is an enlarged view of the rotor 9*c* of the variation. FIG. 18 is a plan view of the rotor 9*c* as viewed from the axial direction, and corresponds to FIG. 4 of the first embodiment.

The rotor 9*c* is different from the rotor 9 of the first embodiment and the second embodiment in terms of the circumferential end portion 33*s* of the magnet 33 being in contact with the salient pole 35.

Moreover, the power module 604 is an example of the applying portion.

In addition, all or part of each function of the controller control portion 400 may be realized by using hardware such as an application specific integrated circuit (ASIC), a programmable logic device (PLD), a field programmable gate array (FPGA), and the like. A program may be recorded on a computer-readable recording medium. The computer-readable recording medium refers to a portable medium, such as a flexible disk, a magneto-optical disk, a ROM, and a CD-ROM, and a storage device, such as a hard disk built in a computer system. The program may be transmitted through a telecommunication line.

Furthermore, the disclosure is not limited to the embodiments described above, and includes various modifications of the embodiments described above without departing from the spirit of the disclosure.

For example, although the wiper motor 1 is exemplified as an example of the motor in the embodiments, besides being used as the wiper motor 1, the motor according to the disclosure may also be used as a drive source for an electrical component (e.g., a power window, a sunroof, an electric seat, or the like) mounted on the vehicle, and for various other purposes.

In addition, the configuration described in the above embodiments may be selected or appropriately changed to another configuration as long as the spirit of the disclosure is not deviated.

What is claimed is:

1. A motor, comprising:
a stator having a stator core that is annular and a plurality of teeth that protrude inward in a radial direction from an inner circumferential surface of the stator core;
a coil wound around the teeth;
a shaft rotating around a rotation axis inside the stator core in the radial direction;
a rotor core fixed to the shaft and having the rotation axis as a radial center;
a magnet located on an outer circumferential surface of the rotor core;
a salient pole located between the magnets circumferentially adjacent to each other on the outer circumferential surface of the rotor core, and protruding further outward than a circumferential end of the magnet in the radial direction;
an applying portion applying a voltage to the coil; and
an applying control portion controlling the applying portion to apply a voltage that satisfies a predetermined condition to the coil,
wherein a ratio of a number of magnetic poles of the magnet to a number of the teeth is 2:3, a waveform of the voltage applied to the coil is a rectangular wave, and the applying control portion controls the applying portion such that voltage application to the coil is started when a tip of the salient pole and an opening portion of the teeth do not face each other.

2. The motor according to claim 1, wherein
the voltage applied to the coil has an advance angle that is a predetermined advance angle among advance angles greater than or equal to 15 degrees and less than or equal to 45 degrees, and a conduction angle that is a predetermined conduction angle among conduction angles greater than or equal to 130 degrees and less than or equal to 150 degrees.

3. The motor according to claim 2, wherein
the advance angle is greater than or equal to 15 degrees and less than 30 degrees.

4. The motor according to claim 1, further comprising:
an acquisition portion acquiring information about an operation environment,
wherein the applying control portion controls the applying portion to apply a voltage having a waveform that is a rectangular wave and an advance angle or a conduction angle that is based on the information.

5. A brushless wiper motor comprising:
the motor according to claim 1.

* * * * *